US007006462B2

(12) United States Patent
Asai

(10) Patent No.: US 7,006,462 B2
(45) Date of Patent: Feb. 28, 2006

(54) SATELLITE COMMUNICATION SYSTEM AND ROUTING METHOD USING THE SAME

(75) Inventor: Akio Asai, Tokyo (JP)

(73) Assignee: NEC Corporation, Tokyo (JP)

( * ) Notice: Subject to any disclaimer, the term of this patent is extended or adjusted under 35 U.S.C. 154(b) by 874 days.

(21) Appl. No.: 09/983,666

(22) Filed: Oct. 25, 2001

(65) Prior Publication Data
US 2002/0048273 A1 Apr. 25, 2002

(30) Foreign Application Priority Data
Oct. 25, 2000 (JP) ............................. 2000-324809

(51) Int. Cl.
H04B 7/185 (2006.01)
H04B 7/204 (2006.01)
H04Q 7/20 (2006.01)

(52) U.S. Cl. ................ 370/316; 370/325; 370/310; 370/319; 370/351; 455/12.1; 455/427; 455/428

(58) Field of Classification Search ................ 370/316, 370/468, 319, 310, 351, 325; 455/427, 428, 455/12.1
See application file for complete search history.

(56) References Cited

U.S. PATENT DOCUMENTS

| 6,604,146 B1 * | 8/2003 | Rempe et al. ............... 709/238 |
| 6,741,573 B1 * | 5/2004 | Asaeda et al. ............... 370/316 |
| 6,941,108 B1 * | 9/2005 | Nawata ..................... 455/12.1 |
| 2001/0036161 A1 * | 11/2001 | Eidenschink et al. ....... 370/316 |
| 2004/0132451 A1 * | 7/2004 | Butehorn et al. ........... 455/445 |

FOREIGN PATENT DOCUMENTS

| JP | 6-53878 | 2/1994 |
| JP | 2520563 | 5/1996 |
| JP | 2581410 | 11/1996 |
| JP | 11-340972 | 12/1996 |
| JP | 10-285207 | 10/1998 |
| JP | 2964936 | 8/1999 |
| JP | 11-341042 | 12/1999 |
| JP | 2000-69072 | 3/2000 |
| JP | 2000-244969 | 9/2000 |
| JP | 2000-358064 | 12/2000 |

* cited by examiner

Primary Examiner—Ricky Ngo
Assistant Examiner—Feben Haile
(74) Attorney, Agent, or Firm—Young & Thompson

(57) ABSTRACT

In a satellite communication system, an address adding portion 22 adds communication data with Next Hop address read out from a routing table portion 21. A line controller 31 judges whether a satellite communication line to the Next Hop address of the IP packet is set or not. If no satellite communication line is set, a call-originating request message is transmitted to a DAMA call-originating table portion 32. The DAMA call-originating table portion 32 has static DAMA call-originating information, and transmits to a DAMA call-originating portion 33 a DAMA call-originating request to the destination IP address of the call-originating request message. The DAMA call-originating portion 33 sets the satellite communication line to the Next Hop address by the DAMA call-originating request, and informs the line controller 31 of the setting of the satellite communication line.

8 Claims, 4 Drawing Sheets

FIG. 2

| DESTINATION IP ADDRESS | DESTINATION NEXT MASK | DESTINATION VSAT/SDC No(*) | TX SPEED | TX FEC RATE | TX MODULATION TYPE | RX SPEED | RX FEC RATE | RX MODULATION TYPE |
|---|---|---|---|---|---|---|---|---|
| 133.20.10.0 | 0xffffff00 | 001002 | 128 | 1/2 | QPSK | 64 | 3/4 | BPSK |
| 10.22.0.0 | 0xffff0000 | 002101 | 1536 | 3/4 | QPSK | 1536 | 3/4 | QPSK |

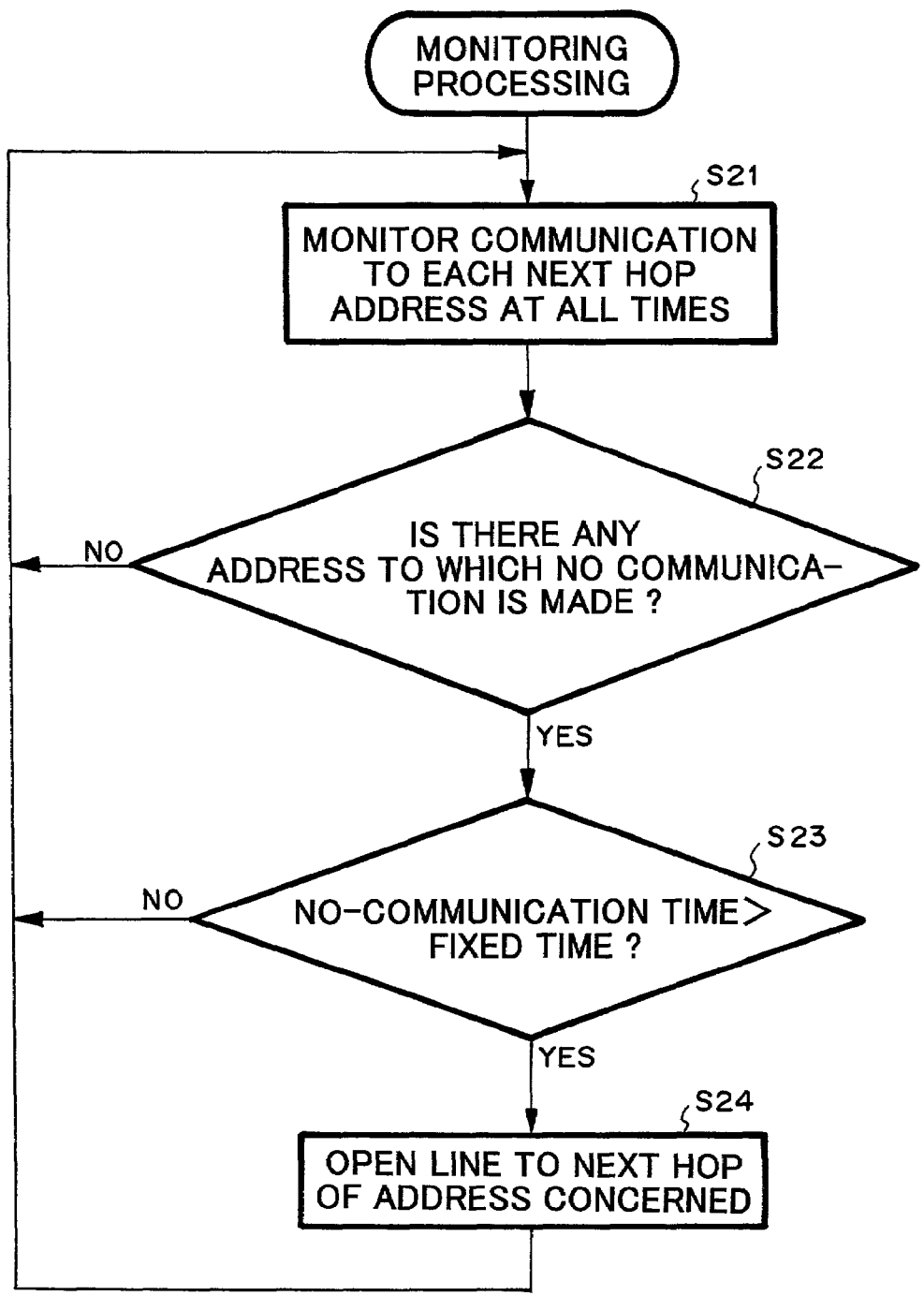

SATELLITE COMMUNICATION SYSTEM AND ROUTING METHOD USING THE SAME

BACKGROUND OF THE INVENTION

1. Field of the Invention

The present invention relates to a satellite communication system and a routing method using the same and particularly, a satellite communication system for performing communications through an artificial satellite and an earth station and a routing method using the same.

2. Description of the Related Art

Since a satellite communication system can cover a broad area, it is used for not only communications between fixed stations (earth stations), but also mobile communications.

When the satellite communication system is applied to mobile communications, a DAMA (Demand Assigned Multiple Access) system for assigning a line every time a communication request occurs is used to efficiently use the satellite communication system because communication requests sporadically are made from many mobile terminals.

Furthermore, in the satellite communication system, satellites and earth stations have been developed in performance, and compact antennas of about 1 m (meter) in diameter have been usable as the frequencies used in the satellite communication system are shifted from a C band (4/6 GHz band) to Ku band (12/14 GHz band).

Earth stations using such compact antennas are called as VSAT (Very Small Aperture Terminal), and they are dispersively located at many places. It is general that a lot of data are transmitted to each of the earth stations through a key (master) station equipped with a large-scale antenna.

In a VSAT satellite communication system using VSAT, a line from a key station to VSAT is called as an out-bound line, and a line from VSAT to a key station is called as an in-bound line. The out-bound line carries out data communications at a high transmission speed, and it uses a TDM (Time Division Multiple) system to perform data multiplexing for each VSAT. The in-bound line carries out data communications from many VSATs at a low transmission speed, and it uses a packet transmission or the DAMA system described above.

A router is generally used as a routing portion. The VSAT satellite communication system is used for checking/introduction of credit cards and transmission of POS (Point Of Sales) data in retail trades, data transmission between an on-line terminal and a host computer in financial business, and transmission of reservation data for hotels, rental cars or the like.

SUMMARY OF THE INVENTION

Therefore, an object of the present invention is to provide a satellite communication system that can set a satellite communication line having a demanded speed when it is required and also can use the band of the satellite communication line efficiently, and a routing method using the satellite communication system.

In order to attain the above object, according to an aspect of the present invention, there is provided a satellite communication system containing a router for carrying out routing of IP (Internet Protocol) packets and DAMA call-originating, said router comprising a routing table portion for performing the routing and a DAMA call-originating table portion that is provided separately from said routing table portion and manages information for the DAMA call-origination.

Further, according to another aspect of the present invention, there is provided a routing method for a router for carrying out routing of IP (Internet Protocol) packets and DAMA call-originating in a satellite communication system, which comprises: providing a routing table for performing the routing and a DAMA call-originating table for managing information for the DAMA call-originating separately from each other, and performing each of the routing based on said routing table and the DAMA call-origination based on said DAMA call-originating table separately from each other.

That is, the present invention can perform the routing of IP packets and the DAMA call-originating in the VSAT satellite communication system, and it can overcome the disadvantage that it is difficult to perform the dynamic routing when the routing portion and the DAMA portion are integrated with each other.

More specifically, according to the present invention, the routing table for carrying out the routing and the DAMA call-originating table for managing the DAMA call-originating information which is static information are separately provided, and the dynamic routing can be performed by using the routing table.

Further, the line speed of a satellite communication line used every destination IP address can be set by managing the DAMA call-originating information every destination IP address with the DAMA call-originating table.

Accordingly, the router containing the routing portion and the DAMA portion that are integrated with each other carry out a DAMA call-originating and sets a satellite communication line having a demanded speed when it is required, whereby the band of the satellite communication line can be efficiently used.

BRIEF DESCRIPTION OF THE DRAWINGS

FIG. 2 is a diagram showing the structure of DAMA call-originating information of a DAMA call-originating table portion of FIG. 1;

FIG. 4 is a flowchart showing the monitoring processing of a line controller of FIG. 1.

DETAILED DESCRIPTION OF THE PREFERRED EMBODIMENTS

A preferred embodiment according to the present invention will be described hereunder with reference to the accompanying drawings.

Figure 1:
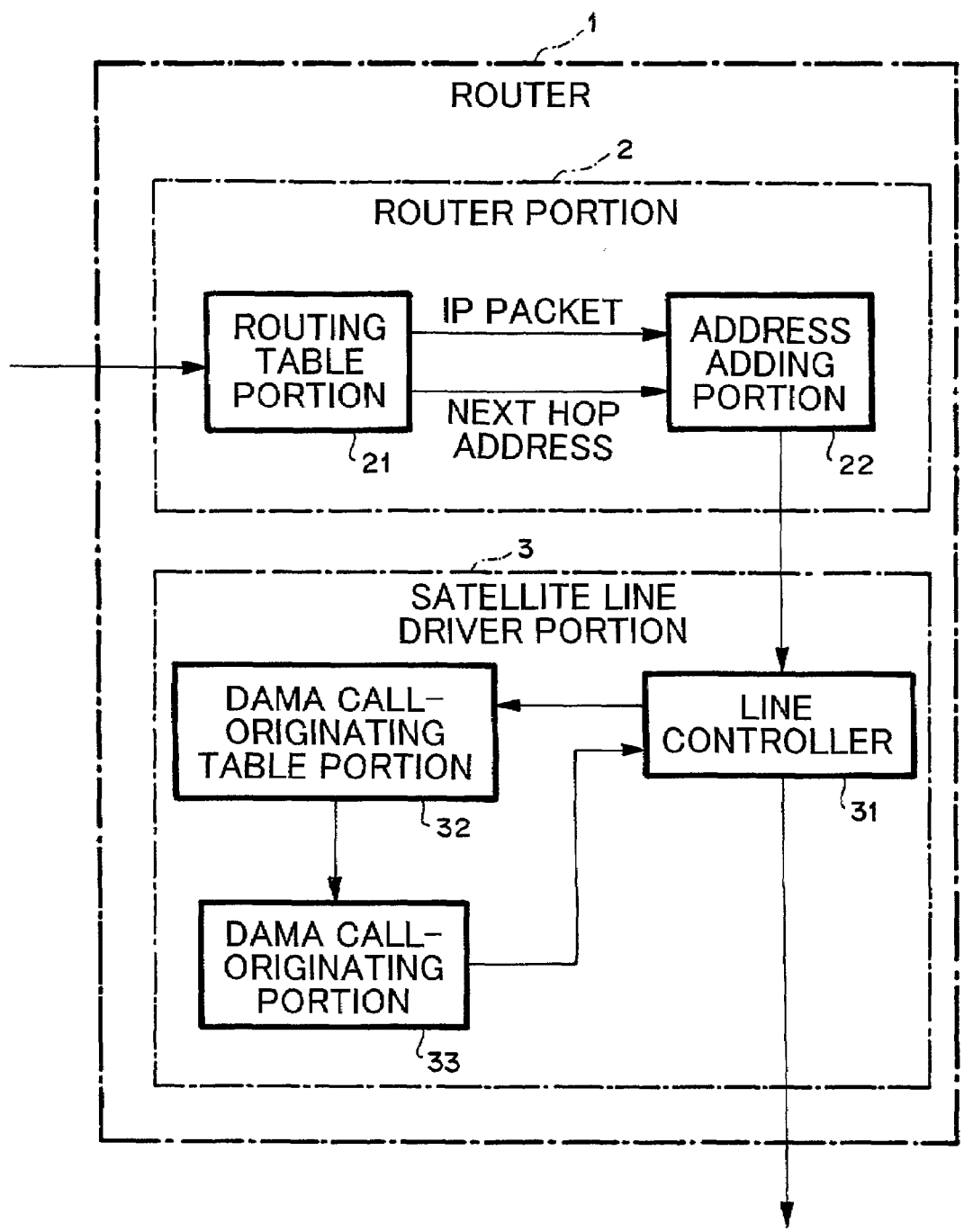
FIG. 1 is a block diagram showing the construction of a router of a satellite communication system according to an embodiment of the present invention.

FIG. 1 is a block diagram showing the construction of a router of a satellite communication system according to an embodiment of the present invention.

In FIG. 1, router 1 comprises router portion 2 and satellite line controller 3.

The router portion 2 comprises routing table portion 21 and address adding portion 22, and satellite line driver portion 3 comprises line controller 31, DAMA (Demand Assigned Multiple Access) call-originating table portion 32 and DAMA call-originating portion 33.

The routing table portion 21 holds a routing table of RIP (Routing Information Protocol), and it can perform dynamic routing by exchanging routing information with another router.

The address adding portion 22 is equipped with means for adding communication data [IP (Internet Protocol) packet] with a Next Hop address that indicates a next transit destination (router) read out from the routing table portion 21.

The line controller 31 judges whether a satellite communication line to the Next Hop address of a packet added with a Next Hop address transmitted from the router portion 2 is set. The line controller 31 is equipped with means for transmitting the IP packet to the satellite communication line when it is judged that the satellite communication line is set, and means for transmitting a call-originating request message to the DAMA call-originating table portion 32 when no satellite communication line is set. Here, the call-originating request message comprises a destination IP address and a Next Hop address.

The DAMA call-originating table portion 32 is equipped with means that has static DAMA call-originating information and transmits to the DAMA call-originating portion 33 a DAMA call-originating request that is directed to the destination IP address of the call-originating request message transmitted from the line controller 31.

The DAMA call-originating portion 33 is equipped with means for setting the satellite communication line to the Next Hop address on the basis of the DAMA call-originating request from the DAMA call-originating table portion 32, and means for informing the line controller 31 of the setting of the satellite communication line.

FIG. 2 shows the structure of the DAMA call-originating information of the DAMA call-originating table portion 32 of FIG. 1.

In FIG. 2, the DAMA call-originating information comprises Destination IP address ([133.20.10.0], [10.22.0.0]), Destination Next Mask ([0xffffff00], [0xffff0000]), Destination VSAT (Very Small Aperture Terminal)/SDC No(*) ([001002], [002101]), TX (Transmission side) Speed ([128], [1536]), TX FEC (Forward Error Control) Rate ([1/2], [3/4]), TX Modulation Type {[QPSK(Quadriphase Phase Shift Keying)]}, RX (Reception side) Speed ([64], [1536]), RX FEC Rate ([3/4]), and RX Modulation Type {[BPSK (Binary Phase Shift Keying)], [QPSK]}.

Figure 3:
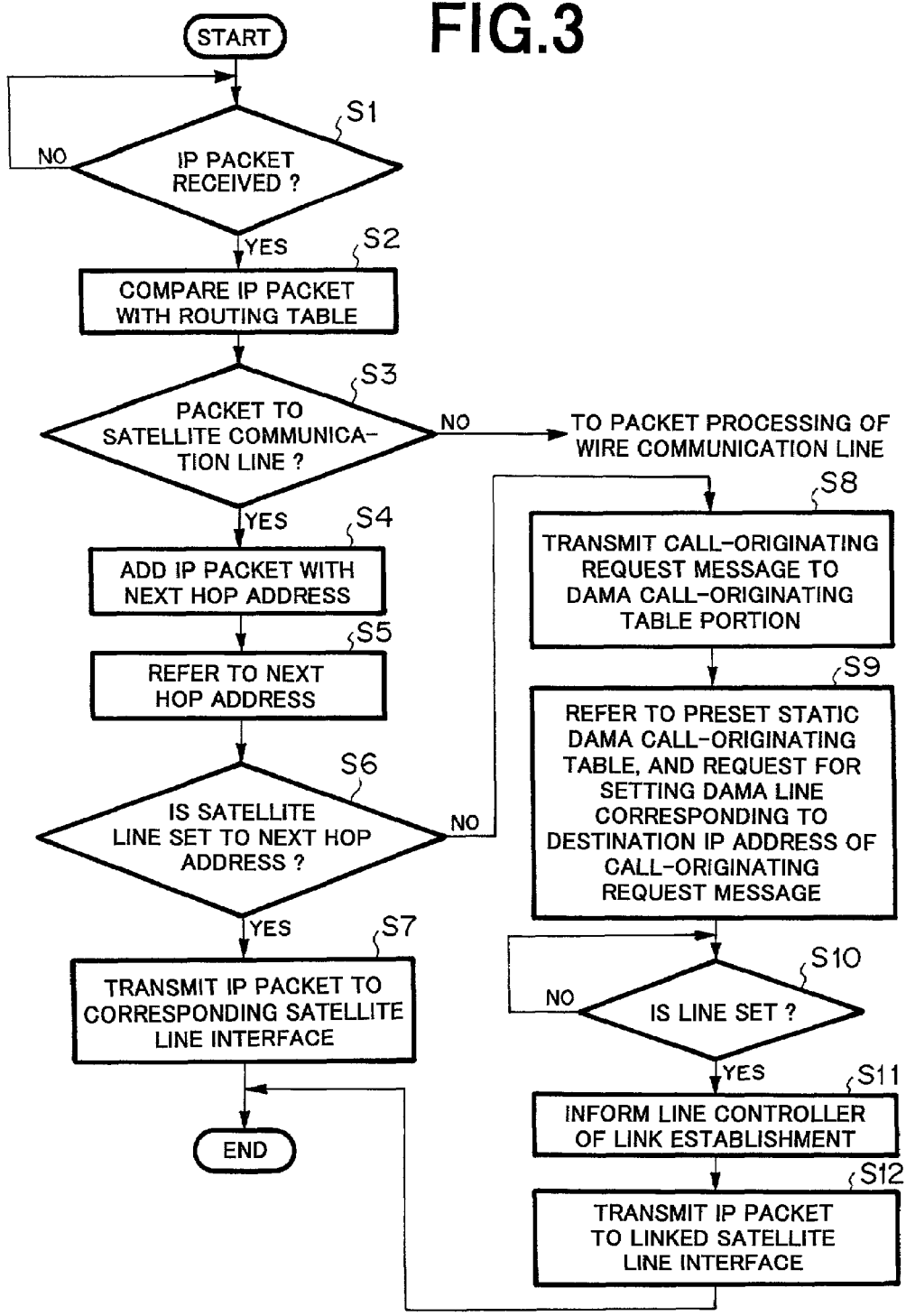
FIG. 3 is a flowchart showing the routing processing of a router shown in FIG. 1.

FIG. 3 is a flowchart showing the routing processing of the router 1 of FIG. 1, and FIG. 4 is a flowchart showing the monitoring processing of the line controller 31. The routing processing according to an embodiment of the present invention will be described with reference to FIGS. 1 to 4.

Upon receiving an IP packet from an earth network (not shown)(step S1 of FIG. 3), the router portion 2 compares the IP packet with the routing table in the routing table portion 21 (step S2 of FIG. 3). If it is judged that the IP packet is addressed to the satellite communication line (step S3 of FIG. 3), it transmits the IP packet to the address adding portion 22.

The address adding portion 22 adds the IP packet transmitted from the routing table portion 21 with the Next Hop address read out from the routing table portion 21 and then transmits the addition result to the line controller 31 (step S4 of FIG. 3).

Upon receiving the packet added with the Next Hop address, the line controller 31 refers to the Next Hop address (step S5 of FIG. 3). If the satellite communication line to the Next Hop address has been already set (step S6 of FIG. 3), the line controller 31 transmits the IP packet to a satellite communication line interface (step S7 of FIG. 3).

If no satellite communication line to the Next Hop address is set (step S6 of FIG. 3), the line controller 31 transmits a call-originating request message to the DAMA call-originating table portion 32 (step S8 of FIG. 3).

The DAMA call-originating table portion 32 has a preset static DAMA call-originating table, and makes a request for setting a DAMA line to the DAMA call-originating portion 33 on the basis of the destination IP address of the call-originating request message (step S9 of FIG. 3).

When the DAMA call-originating portion 33 sets the DAMA line in response to the request from the DAMA call-originating table portion 32 (step S10 of FIG. 3), the DAMA call-originating portion 33 notifies the link establishment to the line controller 31 (step S11 of FIG. 3). Upon receiving the link establishment notification, the line controller 31 transmits the IP packet to the link-established satellite communication line interface (step S12 of FIG. 3).

In the routing table portion 21, the routing information is allowed to be exchanged through the satellite communication line after the satellite communication line is set, and the dynamic routing can be performed.

The line controller 31 monitors the communication to each Next Hop address at all times (step S21 of FIG. 4), and it opens the line to the Next Hop address to which no communication is made for a fixed time (steps S22 to S24 of FIG. 4).

As described above, the routing table portion 21 and the DAMA call-originating table portion 32 are separately provided, and the routing based on the routing table portion 21 and the DAMA call-originating based on the DAMA call-originating table portion 32 are separately carried out, whereby the exchange of the routing information is allowed through the satellite communication line after the satellite communication line is set, and the dynamic routing can be performed.

Further, the DAMA call-originating table portion 32 manages the call-originating information every destination IP address, whereby a line speed that is varied in accordance with the destination IP address can be set to the same Next Hop address.

As described above, by making a DAMA call-origination, the router 1 can set a satellite communication line having a desired transmission speed when it is required, so that the band of the satellite communication line can be efficiently used.

As described above, according to the present invention, in the satellite communication system containing the router for carrying out the routing of IP packets and the DAMA call-origination, the routing table for carrying out the routing and the DAMA call-originating table for managing the information for the DAMA call-origination are separately provided, and the routing based on the routing table and the DAMA call-origination based on the DAMA call-originating table are carried out separately from each other, whereby the satellite communication line having a desired transmission speed can be set when it is required, and the band of the satellite communication line can be efficiently used.

What is claimed is:

1. A satellite communication system containing a router for carrying out routing of IP (Internet Protocol) packets and DAMA call-originating, said router comprising:
a routing table portion for performing the routing and a DAMA call-originating table portion that is provided separately from said routing table portion and manages information for the DAMA call-originating;
means for adding a Next Hop address indicating a next transition destination to a packet when the packet is judged to be transmitted to a satellite communication line in the routing with said routing table portion; and
means for carrying out the DAMA call-origination by using the information of the DAMA call-originating table portion when no satellite communication line to the Next Hop address is set.

2. The satellite communication system as claimed in claim 1, wherein said DAMA call-originating table portion manages the information for the DAMA call-origination every destination IP address.

3. A satellite communication system containing a router for carrying out routing of IP (Internet Protocol) packets and DAMA call-originating, said router comprising:

a routing table portion for performing the routing and a DAMA call-originating table portion that is provided separately from said routing table portion and manages information for the DAMA call-originating;

means for adding a Next Hop address indicating a next transition destination to a packet when the packet is judged to be transmitted to a satellite communication line in the routing with said routing table portion; and means for monitoring communications to the Next Hop address at all times and opening a line to the Next Hop address through which no communication is made for a fixed time.

4. The satellite communication system as claimed in claim 3, wherein said DAMA call-originating table portion manages the information for the DAMA call-origination every destination IP address.

5. A routing method for a router for carrying out routing of IP (Internet Protocol) packets and DAMA call-originating in a satellite communication system, which comprises the steps of:

providing a routing table for performing the routing and a DAMA call-originating table for managing information for the DAMA call-originating separately from each other;

performing each of the routing based on said routing table and the DAMA call-origination based on said DAMA call-originating table separately from each other;

adding a Next Hop address indicating a next transition destination to a packet when the packet is judged to be transmitted to a satellite communication line in the routing based on said routing table; and carrying out the DAMA call-origination by using the information of the DAMA call-originating table when no satellite communication line to the Next Hop address is set.

6. The routing method as claimed in claim 5, wherein said DAMA call-originating table manages the information for the DAMA call-origination every destination IP address.

7. A routing method for a router for carrying out routing of IP (Internet Protocol) packets and DAMA call-originating in a satellite communication system, which comprises the steps of:

providing a routing table for performing the routing and a DAMA call-originating table for managing information for the DAMA call-originating separately from each other;

performing each of the routing based on said routing table and the DAMA call-origination based on said DAMA call-originating table separately from each other;

adding a Next Hop address indicating a next transition destination to a packet when the packet is judged to be transmitted to a satellite communication line in the routing based on said routing table; and monitoring communications to the Next Hop address at all times and opening a line to the Next Hop address through which no communication is made for a fixed time.

8. The routing method as claimed in claim 7, wherein said DAMA call-originating table manages the information for the DAMA call-origination every destination IP address.

* * * * *